(12) United States Patent
Yeh et al.

(10) Patent No.: US 9,680,642 B2
(45) Date of Patent: Jun. 13, 2017

(54) QUANTUM CRYPTOGRAPHY SERVICE NETWORK IMPLEMENTATION STRUCTURE

(75) Inventors: Tzuoh-Chyau Yeh, Yang-Mei (TW); I-Ming Tsai, Yang-Mei (TW)

(73) Assignee: CHUNGHWA TELECOM CO., LTD., Taoyuan County (TW)

( * ) Notice: Subject to any disclaimer, the term of this patent is extended or adjusted under 35 U.S.C. 154(b) by 1043 days.

(21) Appl. No.: 13/029,478

(22) Filed: Feb. 17, 2011

(65) Prior Publication Data

US 2011/0317836 A1 Dec. 29, 2011

(30) Foreign Application Priority Data

Jun. 29, 2010 (TW) .............................. 99121196 A

(51) Int. Cl.
*H04L 9/08* (2006.01)
*H04L 9/12* (2006.01)

(52) U.S. Cl.
CPC .............. *H04L 9/0855* (2013.01); *H04L 9/12* (2013.01)

(58) Field of Classification Search
CPC ................................ H04L 9/0855; H04L 9/12
See application file for complete search history.

(56) References Cited

U.S. PATENT DOCUMENTS

| | | | | |
|---|---|---|---|---|
| 2010/0299526 | A1* | 11/2010 | Wiseman et al. | 713/171 |
| 2011/0243331 | A1* | 10/2011 | Yasuda et al. | 380/279 |
| 2012/0177200 | A1* | 7/2012 | Harrison et al. | 380/278 |
| 2013/0163759 | A1* | 6/2013 | Harrison et al. | 380/268 |

OTHER PUBLICATIONS

Furst, M. et al.; "Free-space quantum key distribution over 144 km"; Advanced Free-Space Optical Communication Techniques/Applications II and Photonic Components/Architectures for Microwave Systems and Displays; edited by Lars J. Sjoqvist, Rebecca A. Wilson, Thomas J. Merlet; Proc. of SPIE vol. 6399, 63990G; (2006).*

Furst M. et al., "Free-space quantum key distribution over 144km", Advanced Free-Space Optical Communication Techniques/Applications II and Photonic Components/Architectures for Microwave Systems and Displays, edited by L. Sjoqvist, R. Wilson, T. Merlet, Proc. of SPIE vol. 6399, 63990G, (2006).*

* cited by examiner

*Primary Examiner* — Kaveh Abrishamkar
(74) *Attorney, Agent, or Firm* — Chun-Ming Shih

(57) ABSTRACT

In order to overcome the limitation of the prior art quantum key terminal equipment not being able to operate across different segments, the present invention discloses a quantum cryptography service network implementation technique to let a point-to-point quantum key equipment in one segment be redesigned to cooperate with other quantum key equipment in other segments to form a quantum key service network. As opposed to the prior art technique of having each segment generates its own quantum key, the present invention can map one pair of quantum key equipment with another pair of quantum key equipment, or map multiple pairs of quantum key equipment connected in series to have quantum keys entirely or partly shared by the quantum key equipment. Therefore, the generated quantum keys can be used across different segments. Each node in the quantum key service network can provide the quantum key to nearby telecommunication equipment in the telecommunication network of the same premises.

8 Claims, 3 Drawing Sheets

QUANTUM CRYPTOGRAPHY SERVICE NETWORK IMPLEMENTATION STRUCTURE

BACKGROUND OF THE INVENTION

1. Field of the Invention

The present invention relates to a quantum key service network implementation technique using a quantum cryptography technique so as to let a private local area network or a telecommunication carrier create a multi-path quantum cryptography service network. Compared with a traditional telecommunication service network, the quantum cryptography service network uses quantum keys provided by quantum key terminal equipment in the quantum key service network to encrypt/decrypt the incoming/outgoing traffic for either end of the network to ensure safe communication.

In order to achieve the above objects, the quantum key service network is managed by a quantum key server, and various types of quantum key terminal equipment and their combination can provide quantum keys to be used by telecommunication networking equipment such as a router. Therefore, the telecommunication network is upgraded to become a telecommunication network with cryptography features.

The present invention can let the telecommunication networking equipment in the digital telecommunication network use the quantum key to encrypt/decrypt the traffic for transmission/reception with an unlimited distance. The content of the traffic can be digital information such as telecommunication control signals, voice, text, data or image.

2. Description of the Prior Art

Presently there are three types of quantum key networking techniques; the first is a centrally managed configuration, in which multiple pairs of quantum key equipment have their sender terminals (Alice) gathered in the center and their receiver terminals distributed remotely to form a star-like quantum key network. In this configuration, a plurality of quantum key network islands is formed; however, it cannot cover the whole telecommunication network service area.

The second configuration is multiple pairs of quantum key equipment with each quantum key equipment connected in series; that is, an Alice of one quantum key equipment is connected with a Bob of the other quantum key equipment, so that a cascaded quantum key network is formed. In this configuration, different quantum keys from different pairs of quantum key equipment have to be synchronized in a traditional network so as to let different pairs of quantum key equipment use the same synchronous quantum key. However, synchronizing the quantum keys in the traditional network means all the actions are open to the public, which could lead to eavesdropping of the quantum keys and possible cracking by a third party.

The third configuration is multiple pairs of quantum key equipment and optical switches used at the same time, wherein various senders (Alice) and receivers (Bob) are connected through optical switches to form the quantum key network. In this configuration, the physical characteristics (such as the insertion loss) of the optical switch could affect the transmission distance of the quantum key, making it difficult to use the quantum key across the whole telecommunication service area. Therefore, the prior art configurations still present shortcomings to be overcome.

In view of the deficiencies of the prior-art techniques, after years of constant efforts the inventor has consequently invented and disclosed a quantum cryptography service network implementation structure in the present invention.

The object of the present invention is to provide a structural design for various types of quantum key terminal equipment and a network implementation technique, thereby extending the application range of the nearly 100% safe quantum key technique. In the present invention, homogeneous or heterogeneous quantum key terminal equipment can be used to pair separately or jointly operate across different regions or different carriers, wherein the quantum keys can be provided to the total telecommunication network for encrypting/decrypting the traffic for transmission/reception to ensure communication security. Therefore, the present invention can be applied to ensure communication security in diplomatic, military or business uses.

SUMMARY OF THE INVENTION

A traditional cryptography technique uses a pseudo random number generator to generate encryption codes and to repeatedly use them for encrypting/decrypting traffic. However, since the routing path is open to the public, the encrypted traffic could be hacked by a third party and sooner or later it could cause the encryption codes to be resolved by a quantum computer.

Therefore, in 1984, an IBM US scientist C. H. Bennett and a professor G. Brassard from Montreal University, Canada discovered and used the characteristic of an instantaneous state of a quantum (single electron or photon) that cannot be replicated to disclose the Quantum Cryptography Protocol—BB84. Presently, a few companies use the BB84 protocol or its derivative to develop photonics quantum key terminal equipment consisting of a sender Alice (please refer to FIG. 1 for an A-type quantum key generator 101 of Site A) and a receiver Bob (please refer to FIG. 1 for a B-type quantum key generator 103 of Site B).

The traditional fiber communication uses light pulses of multiple photons for signal modulation. Theoretically it is possible to control the laser source to generate a light of a single period/wavelength, which is called a photon. This photon is also called the quantum of this wavelength.

When a string of photons are coupled to a single mode fiber, some are absorbed by the fiber and some continue to move on. Whether the photon is absorbed or keeps moving on depends on a probability based on the insertion loss of the unit length of the fiber. In summary, although a single photon possesses a minimum energy, it is possible for the photon to reach the receiver end. The sender Alice repeatedly modulates a string of single photons with random numbers of polarization or phase and transmits them to Bob through a quantum channel. Based on random numbers that are generated on its own, Bob derives the random numbers generated by Alice and follows the BB84 protocol to coordinate the whole process through a traditional channel, wherein the photon(s) received by Bob contains a key (which carries a consistent random number information between Alice and Bob) for encrypting/decrypting the traffic. Such a key is called a quantum key.

The randomly generated information used by Alice and Bob cannot be analyzed by a third party because there is no cause and effect relationship mathematically. As long as a new quantum key keeps being generated and is not used repeatedly, the quantum key cannot be cracked.

Alice and Bob transmit and receive the photons through a single mode fiber, which is called a quantum channel. The photons of a specific wavelength are susceptible to light pulses of the same wavelength. Therefore, in the quantum channel, only light pulses of different wavelength can coexist. On the other hand, a fiber used for traditional fiber communication can have a specific wavelength saved for Alice and Bob to act as a quantum channel, eliminating the need for building a fiber for the quantum channel. However, the energy of the light pulse of the traditional fiber communication is too high for the photons. During operation or maintenance of the traditional fiber communication equipment, it is possible to damage Alice or Bob of the quantum channel of the same fiber.

While the single mode fiber is used for illustration in the above description, a multimode fiber is also possible to act as a quantum channel. In fact, the first experiment on the quantum key uses free space as the quantum channel.

The BB84 protocol comprises: transmission and measurement of photons, verification of photon measurement, validity of photon reception, correction and distillation of photon message and so on; these parameters help to develop the quantum key terminal equipment.

Normal quantum key terminal equipment comprises a sender Alice and a receiver Bob, with an integrated random number generator and a local clock signal receiving device. The quantum key terminal equipment is the key device in implementing the BB84 Protocol, which has Alice and Bob work in pairs through the quantum channel (Please refer to FIG. 1 in which the A-type quantum key generator 101 cooperates with the B-type quantum key generator 103 through the quantum channel 102). Even if there are two identical Alice and Bob respectively, the Alice 1 and the Bob 1 simply cannot work with the Alice 2 and the Bob 2. Moreover, the Alice 1 cannot work with the Bob 2, the Alice 2 cannot work with the Bob 1, the Alice 1 cannot work with the Alice 2, and the Bob 1 cannot work with the Bob 2. Since they do not have a common clock signal source, the Alice 1 and Bob 1 cannot cooperate with the identical Alice 2 and Bob 2, or the Alice 3 and Bob 3.

The present invention uses a hierarchically central clock signal synchronous network as a clock signal source to drive various quantum key terminal equipment (Alice and Bob) having hierarchically central clock signal receiving devices to let them operate synchronously (Please refer to FIG. 4 for a synchronous clock signal channel 401 and FIG. 5 for a synchronous clock signal channels 501, 511 and 521). However, the synchronous clock signal provided by the hierarchically central clock signal synchronous network cannot guarantee that the phases of all quantum key terminal equipment can meet the requirement. Therefore, the sender Alice and the receiver Bob are integrated with accurate local clock signal phase lock loops for adjusting the operating phase, thereby synchronizing the frequencies of all quantum key terminal equipment in the quantum key service network and providing suitable phase to the equipment. The present invention uses the hierarchically central clock signal and the random number generator in the quantum key terminal equipment (Please refer to FIG. 4 for a main quantum random number generator 408 and FIG. 5 for random number generators 503, 513, and 523) to let one pair of Alice and Bob of the quantum key terminal equipment (Alice 1, A-type quantum key generator 210 and Bob 1, the left side of the AB-type quantum key generator 201 of Site B) use the same random number generator (the random number generator 503 in FIG. 5) with another pair of Alice and Bob (Alice 2, the right side of the AB-type quantum key generator 201 of Site B and Bob 2, B-type quantum key generator 220) and to coordinate their operations; therefore, the head end of Alice 1 (A-type quantum key generator 210) and the tail end of Bob 2 (B-type quantum key generator 220) will get the same quantum key ad so forth. Therefore, a string of N pairs of Alice 1, Bob 1, Alice 2, Bob 2, . . . and Bob N can get the same quantum key to pass beyond the original function that the quantum key terminal equipment can provide, making it possible for a quantum key to be used across different areas and to realize the quantum key service network.

The quantum cryptography service network implementation technique can let different pairs of Alice/Bob of separate network segments jointly operate to implement the quantum key service network; if it is to relay a quantum key to different segments, it is possible to replace the AB-type quantum key generator 201 with a combination-type quantum key generator in FIG. 4 to relay the quantum key. In this way it is possible to extend the reach of the quantum key and to expand the network topology; so the surrounding telecommunication networking system can use the quantum key to encrypt/decrypt the traffic of the whole telecommunication network. Besides, it is possible to use the quantum key to encrypt/decrypt the traffic end to end and across different regions.

The quantum key service network can let the telecommunication networking equipment, such as a router, continuously obtain all the quantum keys from the surrounding quantum key terminal equipment for encrypting/decrypting the traffic. The quantum key service network system comprises: (1) various types of quantum key terminal equipment and their combination; since there are a few companies providing heterogeneous quantum key terminal equipment (the derivatives of the BB84 protocol); in view of this, the present invention can combine a variable number of homogeneous or heterogeneous quantum key terminal equipment. For example, in FIG. 1, it is possible to combine the A-type quantum key generator 101 (Alice) with the B-type quantum key generator 103 (Bob). In FIG. 2, it is possible to use the AB-type quantum key generator 201 (both Alice and Bob). In FIG. 4, it is possible to use the combination-type quantum key generator (the star-like multi-terminal Alice and Bob). (2) Discontinuous quantum channel; each pair of Alice and Bob has its own dedicated fiber to act as the quantum channel. These numerous quantum channels are not connected as a whole, so the whole quantum channel is discontinuous. (3) A quantum key management server; a quantum key management server can manage multiple pairs of quantum key terminal equipment and provide the generated quantum keys for the nearby routers or other telecommunication networking equipment for decrypting/encrypting the traffic.

In FIG. 1, the A-type quantum key generator 101 of Site A and the B-type quantum key generator 103 of Site B are connected through the quantum channel 102 and generate their own quantum key. The B-type quantum key generator 103 of Site C and the A-type quantum key generator of Site B are connected through the quantum channel and generate their own quantum key. The key generated by Site A and Site B is different from that generated by Site B and Site C. However, since the quantum key server 107 of Site B knows the key generated by Site A and Site B, and it also knows the key generated by Site B and Site C, it is possible to use the classical channel 105 to coordinate the edge router 104 of Site A and Site C to synchronize the key to let the custom premise equipment 109 of Site A and Site C communicate to the classical channel 105 through the edge router 104 to ensure encrypted/decrypted communication. At the same time, the quantum key server 107 of Site B coordinates the edge router 104 for key synchronization through the classical channel 105; therefore it is possible that the key may be eavesdropped or cracked.

In FIG. 2, the AB-type quantum key generator 201, under the control of the quantum key server 207, can generate a key between Site A and Site B, and a key between Site B and Site C. Because of the AB-type quantum key generator 201, the A-type quantum key generator 210 of Site A, and the B-type quantum key generator 220 of Site C are integrated with a synchronous clock signal receiving device. Please refer to FIG. 5 for the synchronous clock signal channels 501, 511 and 521. The clock signal source can be referred to the synchronous clock signal source 301 which transmits the clock signal to the derivative-type synchronous clock signal source 302 through the synchronous clock signal channel 303. In this hierarchy, the source 301 acts as the trunk to pass the clock signal to the branches and then to the numerous A-type, B-type and AB-type quantum key generators, thereby synchronizing the operations.

In FIG. 4, the combination-type quantum key generator uses the integrated clock signal receiving unit 402 to receive the clock signal (such as 2 MHz or 10 MHz) through the synchronous clock signal channel 401 and to derive a clock signal that is two times, four times, a half, or a quarter of the original clock signal. The derived clock signals are provided to each functional module of the combination-type quantum key generator.

In summary, the quantum key terminal equipment of each node in the quantum key network uses a common random number generator which complies with the BB84 Protocol or its derivatives to generate the quantum key which is consistent between adjacent nodes. The original BB84 Protocol can only guarantee the consistency of the quantum key content of the sender Alice and the receiver Bob. In the present invention, the adjacent nodes such as Alice 1 and Bob 1, Bob 1 and Alice 2, and Alice 2 and Bob 2 can share the quantum key with consistent content. For example, in FIG. 2, the A-type quantum key generator 210 of Site A and the AB-type quantum key generator 201 of Site B are connected through the quantum channel 211. The AB-type quantum key generator 201 of Site B and the B-type quantum key generator 220 of Site C are connected through the quantum channel 221 and so forth. Therefore, in the quantum key network, any sender at the head end will have a consistent quantum key with the receiver at the tail end. So the quantum key network topology could be a serial type, or a star type, or their combination; and in the star configuration no optical switch is required in the quantum channel. In this structure, it is possible to avoid the insertion loss or the accumulated insertion loss of the serial type quantum channel in the quantum cryptography service network structure in the telecommunication network.

Another distinguishing characteristic of the present invention is that, in the quantum key network, the contents of the quantum keys of the head/tail nodes are consistent; however, the nodes between the head/tail nodes do not know the contents of the quantum keys of the head/tail nodes, which means the node 1 and node 2 can generate a quantum key, the node 2 and node 3 can generate a quantum key, and the node 1 and node 3 can generate a quantum key which is unknown to the node 2. Furthermore, the node 3 and node 4 can generate a quantum key, the node 2 and node 4 can generate a quantum key which is unknown to the node 3, the node 1 and the node 4 can generate a quantum key which is unknown to the node 2 and the node 3, and so on.

BRIEF DESCRIPTION OF THE DRAWINGS

The drawings disclose an illustrative embodiment of the present invention which serves to exemplify the various advantages and objects hereof, and are as follows.

REFERENCE NUMERALS

Figure 1:
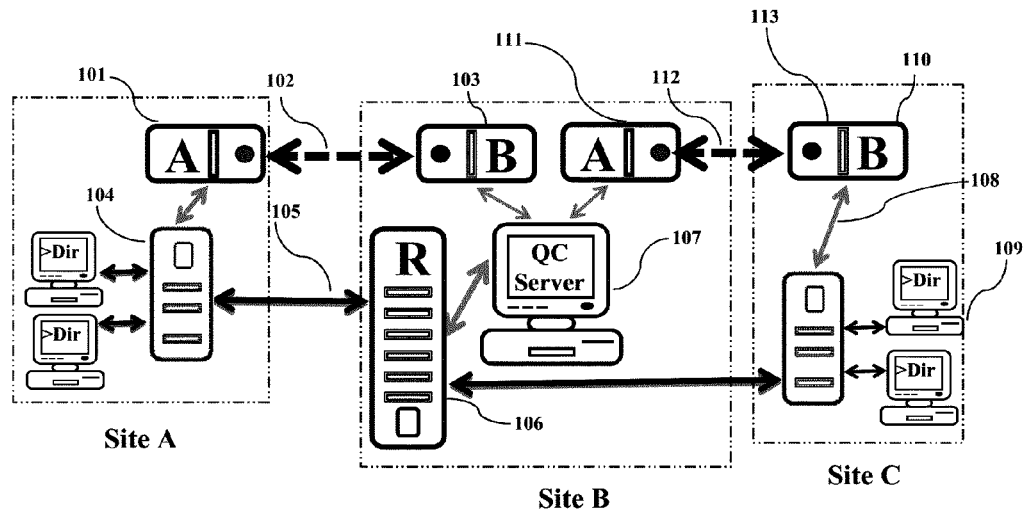
FIG. 1 illustrates a prior art quantum key system structure and the method of using the quantum key across different segments.

101 A-type quantum key generator
102 Quantum channel
103 B-type quantum key generator
104 Edge router
105 Classical channel
106 Core router
107 Quantum key server
108 Encrypted key channel
109 Custom premise equipment
110 Embedded synchronous clock signal and quantum random number generator
111 A-type quantum key generator
112 Quantum channel
113 B-type quantum key generator
201 AB-type quantum key generator
202 Core router A
203 Core router B
204 Encrypted key channel
205 Encrypted key channel
206 Encrypted key channel
207 Quantum key server
208 Classical channel
209 Classical channel
210 A-type quantum key generator
211 Quantum channel
212 Encrypted key channel
213 Classical channel
214 Classical channel
215 Custom premise equipment
216 Edge router
220 B-type quantum key generator
221 Encrypted key channel
222 classical channel
223 classical channel
224 Edge router
225 Custom premise equipment
301 Source-type synchronous clock signal generator
302 Derivative-type synchronous clock signal generator
303 Synchronous clock signal channel
304 Combination-type quantum key generator
305 Quantum channel
306 Synchronous clock signal channel
307 Quantum channel
308 AB-type quantum key generator
309 AB-type quantum key generator
310 Source-type synchronous clock generator
401 Synchronous clock signal channel
402 clock signal receiving unit
403 Subset of sub-quantum random number generator
404 Sub-quantum random number generator
405 B-type quantum key generator 406 B-type heterogeneous quantum key generator
407 Subset of main quantum random number generator
408 main quantum random number generator
409 A-type heterogeneous quantum key generator
410 A-type quantum key generator
411 Quantum key server channel
501 Synchronous clock signal channel
502 Clock signal receiving unit
503 random number generator
504 encrypted key channel
505 Quantum channel
506 Quantum channel
511 Synchronous clock signal channel
512 Clock signal receiving unit
513 random number generator
514 Encrypted key channel
515 Quantum channel
521 Synchronous clock signal channel
522 clock signal receiving unit
523 random number generator
524 encrypted key channel
525 Quantum channel

DETAILED DESCRIPTION OF THE PREFERRED EMBODIMENT

The present invention provides a quantum cryptography service network implementation technique, wherein the network comprises: (1) a hierarchically central clock signal synchronous network having an extremely accurate clock signal generation source to transmit the clock signal to a lower level through a dedicated synchronous clock signal channel. Numerous hierarchically distributed derivative-type synchronous clock signal generators receive and re-generate the clock signal for next-level equipment of the same premises. The configuration is shown in FIG. 3. The source-type synchronous clock signal generator 301 is an extremely accurate clock signal generator and acts as the reference clock signal source for the whole clock signal synchronous network of the carrier; the clock signal is distributed through the synchronous clock signal channel 303 to each central office and then distributed to the lower level; the derivative-type synchronous clock signal generator 302 receives and re-generates the clock signal and transmits the clock signal to the lower level derivative-type synchronous clock signal generator if necessary, thereby forming a tree type clock signal synchronous network. The clock signal generated by each derivative-type synchronous clock signal generator is provided to the nearby quantum key generating equipment, including the A-type quantum key generator 210 of Site A and the B-type quantum key generator 220 of Site B, the AB-type quantum key generator 201 of Site B in FIG. 2, and the combination-type quantum key generator in FIG. 4.

Figure 2:
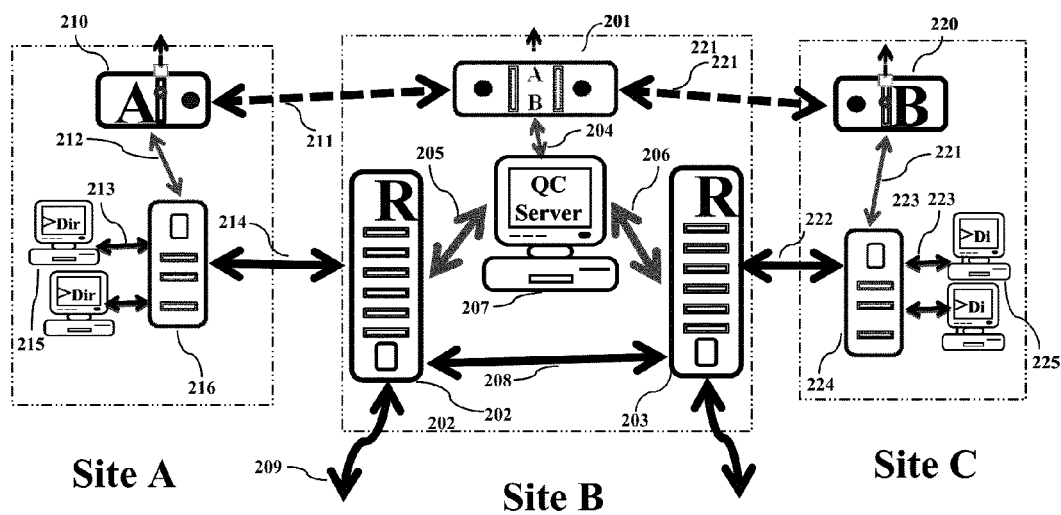
FIG. 2 illustrates a system structural view of an AB-type quantum key system wherein the quantum key is used across different segments.
Figure 3:
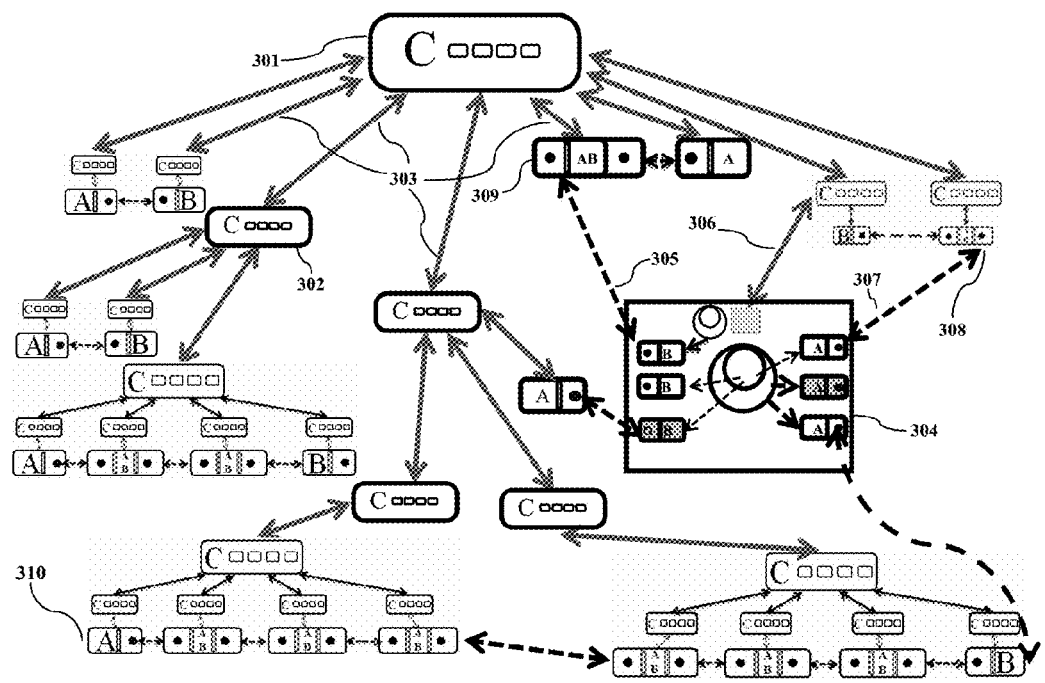
FIG. 3 illustrates a system structural view of a quantum key service network in the present invention.

(2) The quantum key service network consists of numerous and various types of quantum key terminal equipment distributed around the network, wherein a sender Alice is connected to a receiver Bob through the quantum channel; for example, in FIG. 2, the A-type quantum key generator 210 of Site A and the AB-type quantum key generator 201 of Site B are connected through the quantum channel 211. The AB-type quantum key generator 201 of Site B and the B-type quantum key generator 220 of Site C are connected through the quantum channel 221. Therefore Site A and Site B can generate a common quantum key, and for the same reasons Site B and Site C can also generate a common quantum key. More particularly, Site A and Site C can also generate a common quantum key, making it an unprecedented achievement for the present invention. Besides, the quantum channel 211 of Site A and the quantum channel 221 of Site C is not directly linked. Moreover, Site B is not aware of the common quantum key generated by Site A and Site C.

Also in FIG. 3, the B-type quantum key generator 308 is connected with the combination-type quantum key generator 304 through the quantum channel 307, and then is connected with the A-type quantum key generator 309 through the quantum channel 305. Therefore, they can generate a common quantum key. Then again, the B-type quantum key generator 308 is connected with the A-type quantum key generator 310 in FIG. 3 through the quantum channel 307 to generate a common quantum key. As described above, these key generators jointly form the quantum key service network and provide the generated quantum key for the nearby telecommunication networking equipment.

(3) A quantum cryptography service network consists of various type of telecommunication networking equipment. As shown in FIG. 2, the custom premise equipment 215 of Site A transmits the traffic through the classical channel 213 and the edge router 216, and then through the classical channel 214 to the core router A 202 of Site B, and through the classical channel 208 to the core router B 203. Then the traffic is transmitted through the classical channel 222 to the edge router 224 of Site C, and then through the classical channel 223 to the custom premise equipment 225. On the other hand, the edge router 216 of Site A asks the A-type quantum key generator 210 for the quantum key of Site C through the encrypted key channel 212. The key generator 210, managed by the quantum key server 207 of Site B, provides the quantum key through the encrypted key channel for encrypting/decrypting the traffic. As shown in FIG. 2, the core router 202 asks the quantum key server 207 for the quantum key through the encrypted key channel. When the core router 202 asks for the key, it must report the serial number of the corresponding quantum key server of the core router or edge router in the quantum key service network to the quantum key server 207 in advance. Then the quantum key server 207 will provide the corresponding quantum key of the target quantum key server to the core router 202.

The AB-type quantum key generator in the quantum key service network is quantum key terminal equipment developed based on the BB84 Protocol and acts as both Alice and Bob. As shown in FIG. 2, the AB-type quantum key generator 201 of Site B is connected with the Alice and Bob of Site A and Site C, respectively. And these key generators can receive a synchronous clock signal. Furthermore, in the AB-type quantum key generator, a common random number generator is shared between Alice and Bob; therefore, according to BB84 Protocol, the quantum keys are synchronously generated and are consistent in their contents.

Figure 4:
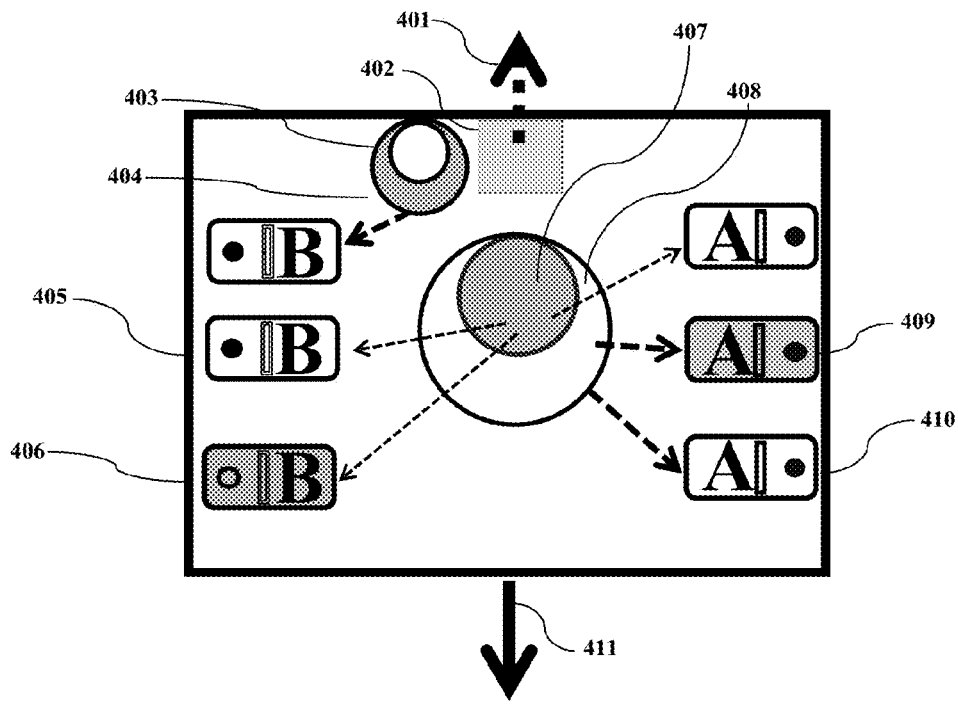
FIG. 4 illustrates a system structural view of a combination-type quantum key generator.
Figure 5:
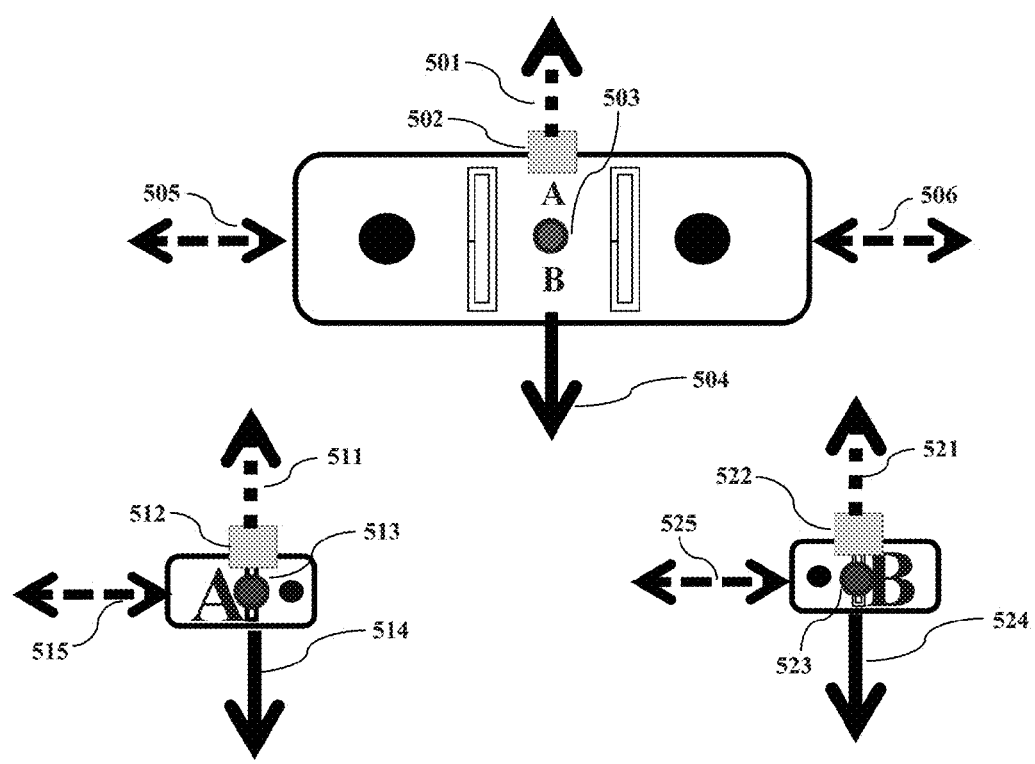
FIG. 5 illustrates structural views of a synchronous clock signal receiver and a random number generator in the present invention.

The operational principle of the synchronously generated quantum keys with consistent contents in the present invention can be applied to the combination-type quantum key generator in FIG. 4, and also to all the quantum key generators in FIG. 3, thereby implementing the quantum key service network. Back to FIG. 1, in which Alice and Bob 103 of Site B is not synchronous and the generated quantum keys are irrelevant, it is not possible for Site A and Site C to have a common quantum key and to have the affiliated router decrypt/encrypt the traffic.

The present invention uses the quantum cryptography technique to provide a quantum key service network implementation technique so as to let the telecommunication carrier establish a multi-path quantum cryptography service network to cover the whole telecommunication network. Traditional telecommunication equipment can use the quantum key to form the quantum cryptography service network. As compared with prior art quantum cryptography techniques, the present invention is advantageous in the following:

1. The present invention uses the prior art hierarchically central clock signal synchronous network to skillfully solve the problem of the prior art quantum key terminal equipment not being able to communicate across different segments or domains.
2. The present invention uses the implementation structure which completely complies with the BB84 Protocol to solve the problem of one quantum key not being applicable across different segments or domains. It is not necessary to transmit the quantum key through a traditional network and to have it regenerated or modified to be used in the quantum key terminal equipment in a different segment. On the other hand, the prior art technique modifies the quantum key through a traditional network, which could compromise the security of the quantum key.
3. The present invention uses the implementation structure to let the quantum key terminal equipment work across different segments or domains. It is not necessary to use optical switches to extend the communication range of the sender Alice and the receiver Bob. On the other hand, the prior art technique has to use optical switches, which could cause some physical problems such as optical switch insertion loss or maintenance/management problems.
4. The present invention provides a combination-type quantum key terminal equipment which can work across different segments, and compared with prior art quantum key terminal equipment, its structure is simple, it is heterogeneous, and it can comply with different quantum key terminal equipment of different speeds to overcome the limitation of a single terminal type in the prior art.
5. In the quantum key network, the contents of the quantum keys of the head/tail nodes are consistent; however, the nodes between the head/tail nodes do not know the contents of the quantum keys of the head/tail nodes.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A quantum cryptography service network implementation structure, comprising:
    a hierarchically central clock signal synchronous network, comprising:
        a 10M Hz or high frequency clock signal generator, configured at a root node of the hierarchically central clock signal synchronous network, and providing a clock signal to a lower level through a dedicated synchronous clock signal channel which is fiber or wireless telecommunication like;
        a plurality of derivative-type synchronous clock signal equipment, each of the derivative-type clock signal equipment being configured at a branch node of the hierarchically central clock signal synchronous network to transmit the clock signal, a frequency of the clock signals are the same in a clock network;
    a plurality of quantum nodes, configured under the derivative-type clock signal equipment, each quantum node receiving the clock signal, configuring a phase lock loop to synchronize the clock signal, and using the clock signal as a time base to generate a random number sequence,
    wherein the quantum nodes are selected to link each other via a fiber media or a free space to form a quantum key network and a quantum channel, any two of the quantum nodes of the quantum key network are defined as a sender Alice and a receiver Bob respectively, the sender Alice and the receiver Bob have built-in quantum phase alinement mechanism, and the Alice and the Bob adjust an optical quantum phase and compare the random number sequences and generate a group quantum primitive keys according to a comparing result; the group quantum primitive keys become practice quantum keys by sifting and privacy confirm processes through classical channels, these processes are compliance BB84 protocol; and
    a quantum key server, connected to the sender Alice or the receiver Bob through an encrypted key channel, and providing the practice quantum key to a user network equipment through a dedicate quantum key buses channel,
    wherein an intermediate quantum node between a far sender Alice and a far receiver Bob is configured to provide a random number generator for a local sender Alice and a local receiver Bob, and then both the far and local sender Alice and the receiver Bob are synchronized by the clock signal so as to generate the primitive quantum key dedicated to the sender Alice and the receiver Bob, and
    wherein the intermediate quantum node is not aware of the quantum key dedicated to the far sender Alice and the far receiver Bob.

2. The quantum cryptography service network implementation structure as claimed in claim 1, wherein the primitive quantum key is generated by at least one of: an A-type quantum key generator, a B-type quantum key generator, an AB-type quantum key generator, or a combination thereof, which are based on BB84 and its derived quantum cryptography protocol, and an operate clock rate thereof are same or a sub-rate discussing between dedicated nodes communicate via the classical channels.

3. The quantum cryptography service network implementation structure as claimed in claim 1, wherein the quantum channel connects the sender Alice and the receiver Bob through one of: a fiber or a free space, and a quantum signal uses the optical quantum phase instead of an optical quantum polarization.

4. The quantum cryptography service network implementation structure as claimed in claim 2, wherein at least one primitive quantum key generator, between the sender Alice and receiver Bob, comprises an A-type quantum key generator, a B-type quantum key generator, an AB-type quantum key generator, or a combination thereof, wherein the primitive quantum key generator interconnects the sender Alice and the receiver Bob via quantum channel sections.

5. The quantum cryptography service network implementation structure as claimed in claim 1, wherein the quantum key server manages the quantum key generation rate and the quantum key service rate of surrounding quantum key generators via quantum key buses and telecommunication networking equipment via the classical channels.

6. The quantum cryptography service network implementation structure as claimed in claim 1, wherein the random number sequence generated by the Alice defines a first random number sequence, the random number sequence generated by the Bob defines a second random number sequence, the Alice transmits the first random number sequence that only part of the first random number sequence reach to the Bob by the quantum channel, the Bob compares the part of arriving first random number sequence and the second random number sequence to generate the primitive quantum key.

7. The quantum cryptography service network implementation structure as claimed in claim 6, wherein the Alice or adjacent Alice transmits the first random number sequence to the Bob by the connected quantum channel discontinuously.

8. The quantum cryptography service network implementation structure as claimed in claim 1, wherein the Alice and the Bob use the same random number sequence for a quantum key generator which comprises an AB-type quantum key generator or a combination of one or more unit A-type quantum key generators and one or more unit B-type quantum key generators.

\* \* \* \* \*